May 4, 1926.

J. NEHL 1,583,305

MACHINE FOR CLEANING KITCHEN UTENSILS

Filed April 14, 1925

Witnesses

Inventor Johann Nehl

Patented May 4, 1926.

1,583,305

UNITED STATES PATENT OFFICE.

JOHANN NEHL, OF COLOGNE-SULZ, GERMANY.

MACHINE FOR CLEANSING KITCHEN UTENSILS.

Application filed April 14, 1925. Serial No. 22,953.

*To all whom it may concern:*

Be it known that I, JOHANN NEHL, a citizen of the German Republic, residing at Cologne-Sulz, De Noel Platz 7, Germany, have invented certain new and useful Improvements in Machines for Cleansing Kitchen Utensils, of which the following is a specification.

This invention relates to machines for cleansing or washing of dishes, plates, bowls, cups and similar articles. With these machines the table-utensils are packed into baskets, which are hanging on endless chains. By means of these chains the baskets are drawn through two tanks, the first of them serves for soaking the grease and dirt and precleansing the dishes, whereas the second serves to wash the table utensils or the like fully and cleanly. The machines known up to date are constructed so that the kitchen utensils can be packed in great numbers into baskets, but this has the disadvantage that every piece of the kitchen-utensils is not thoroughly rinsed and cleaned. There are machines at present known, having baskets hanging from endless carriers, but these machines cause much waste of time and material.

The invention consists in providing carriers for the articles to be cleansed on the outside of the chain, which are adapted each to receive one single piece. The putting up as well as the unpacking of the kitchen utensils is done during the working of the machine. By so doing the kitchen utensils are rinsed totally and thoroughly whilst the machine is running continuously.

With these and other objects in view, the invention consists in the construction, arrangement and combination of the various parts of my device, whereby the objects contemplated are attained, as hereinafter more fully set forth, pointed out in my claim, and illustrated in the accompanying drawings, in which:

Similar reference characters are used to indicate similar parts throughout in the several views.

Figure 1:
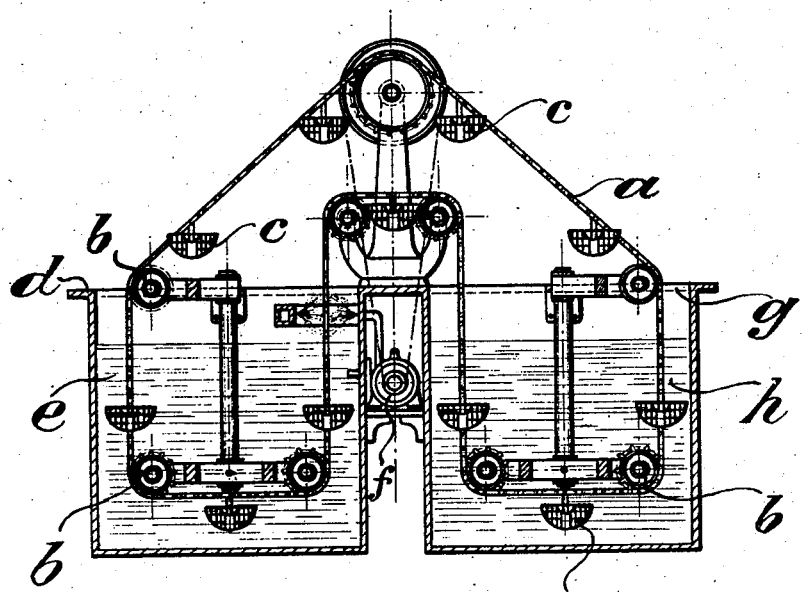
Figure 1 shows a cross section of the machine.
Figure 2:
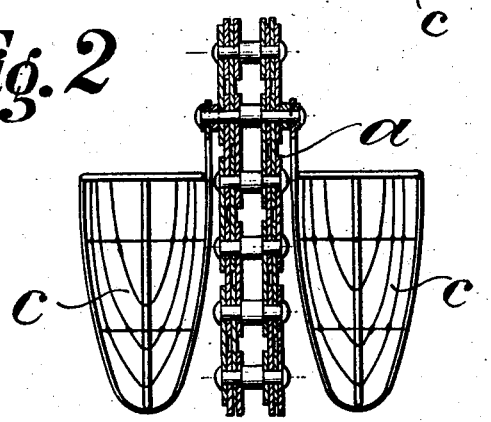
Figure 2 shows a part of the chain with two baskets for carrying the kitchen utensils.

The chain $a$ is of the endless type and is guided over sprocket wheels or rolls $b$ in the manner shown clearly in Figure 1 of the drawing. At short intervals upon this chain $a$ are placed small baskets $c$ preferably in pairs and hinged to the chain $a$ as shown in Figure 2. These baskets are constructed of any suitable reticulated material and of sufficient size so as to accommodate a single plate, cup or the like.

The chain may be driven by any one of the sprocket wheels $b$ shown in Figure 1 from any suitable source of power, not shown.

As the baskets pass the point $d$ shown in Figure 1 an article to be cleaned is placed in a basket $c$ while the chain is continuously operated. The basket containing the article to be cleaned then passes downward into the cleansing liquid in the pre-washing tank $e$. It then passes horizontally towards the right as shown in Figure 1 and close to the bottom of the tank $e$ until it again moves upward at the extreme right of the tank $e$ and emerges from the liquid.

Immediately upon leaving the liquid it is subjected to a powerful spray upon all sides. The pump $f$ placed between the two tanks draws water from the tank $e$ and forces it under pressure into the spraying device.

Upon leaving the spraying device the baskets are carried upward by the chain so as to clear the partition dividing the two tanks and is then carried horizontally over the partition and then downward in to the second tank $h$ containing a cleansing liquid. The baskets pass through the tank $h$ in the same manner that they have previously passed through the tank $e$ until they arrive at the point $g$ shown in the drawings when the articles in the baskets are removed therefrom.

The operation of the machine is believed to be clear from the above description. The soiled dishes are first soaked in the liquid in tank $e$ and the grease and other material are loosened therefrom. The dishes are then subjected to a powerful spray which thoroughly cleanses each individual dish or kitchen utensil due to the fact that the water or other cleansing liquid is enabled to come in contact with every part of it. From the spray it is carried for a final cleansing bath to the tank $h$. By the above system every article of kitchen utensil will be thoroughly cleaned.

Some changes may be made in the construction and arrangement of the invention above set forth without departing from the real purpose and spirit thereof, and it is the intention to cover by the following claim, any modified forms of structure or use of equivalents, which may be reasonably included within their scope.

I claim:—

In an automatic dish washing or cleansing machine, two tanks positioned adjoining one another containing cleansing liquid, a pump drawing liquid from one of said tanks, a spraying device connected to said pump and disposed in proximity to the adjacent sides of said tanks, an endless chain passing through both tanks, baskets pivotally disposed on each side of said chain so as to be carried by said chain through said tanks and past said spraying device.

In testimony whereof I affix my signature.

JOHANN NEHL.